(12) United States Patent
Hwang et al.

(10) Patent No.: US 9,985,269 B2
(45) Date of Patent: May 29, 2018

(54) HIGHLY HEAT-RESISTANT FILM FOR ELECTRODE TERMINALS

(75) Inventors: Man Yong Hwang, Seongnam-si (KR); Gi Rin Kim, Suwon-si (KR); Jong Ho Kim, Gunpo-si (KR)

(73) Assignee: SHIN HEUNG ENERGY & ELECTRONIC CO., LTD., Osan-si (KR)

( * ) Notice: Subject to any disclaimer, the term of this patent is extended or adjusted under 35 U.S.C. 154(b) by 168 days.

(21) Appl. No.: 14/386,609

(22) PCT Filed: Aug. 16, 2012

(86) PCT No.: PCT/KR2012/006498
§ 371 (c)(1),
(2), (4) Date: Sep. 19, 2014

(87) PCT Pub. No.: WO2013/147372
PCT Pub. Date: Oct. 3, 2013

(65) Prior Publication Data
US 2015/0086863 A1  Mar. 26, 2015

(30) Foreign Application Priority Data

Mar. 26, 2012 (KR) ........................ 10-2012-0030397
Aug. 14, 2012 (KR) ........................ 10-2012-0088836

(51) Int. Cl.
*H01M 2/30* (2006.01)
*H01M 2/06* (2006.01)
(Continued)

(52) U.S. Cl.
CPC ............... *H01M 2/30* (2013.01); *H01M 2/06* (2013.01); *H01M 2/08* (2013.01);
(Continued)

(58) Field of Classification Search
CPC ............ B29C 47/0004; B29C 47/0021; B29C 47/065; B29K 2101/12; B29K 2105/0044;
(Continued)

(56) References Cited

U.S. PATENT DOCUMENTS 5,552,504 A * 9/1996 Bennett ................... C08F 6/02
524/553
6,797,430 B1 9/2004 Hatta et al.
(Continued)

FOREIGN PATENT DOCUMENTS

| JP | 2008-027823 A | 2/2008 |
|---|---|---|
| WO | WO 2008-007867 A1 | 1/2008 |
| WO | WO 2011-024286 A1 | 3/2011 |

*Primary Examiner* — Lingwen R Zeng
(74) *Attorney, Agent, or Firm* — Rabin & Berdo, P.C.

(57) ABSTRACT

Disclosed is a highly heat-resistant film for electrode terminals. The heat-resistant film includes a polymer layer as a central substrate to be sealably interposed between a pouch and electrode terminals. The polymer layer is formed of a mixture of (a) at least one polymer selected from the group consisting of an ethylene-norbornene copolymer and a polymethylpentene with (b) a polypropylene resin. Preferably, the polypropylene resin is highly heat resistant and the mixture has a weight ratio of 1.9 to 5:5. The heat-resistant film simultaneously meets requirements in terms of thermal adhesiveness and high temperature dimensional stability, which are contradictory to each other in conventional films for electrode terminals of secondary batteries. In addition, the heat-resistant film has enhanced electrolyte resistance to improve the durability of a secondary battery.

10 Claims, 1 Drawing Sheet

(51) Int. Cl.
*H01M 2/08* (2006.01)
*B29C 47/00* (2006.01)
*B29K 101/12* (2006.01)
*B29C 47/06* (2006.01)
*B29K 105/00* (2006.01)

(52) U.S. Cl.
CPC ...... *B29C 47/0004* (2013.01); *B29C 47/0021* (2013.01); *B29C 47/065* (2013.01); *B29K 2101/12* (2013.01); *B29K 2105/0044* (2013.01); *B29K 2995/0016* (2013.01)

(58) Field of Classification Search
CPC .. B29K 2995/0016; H01M 2/06; H01M 2/08; H01M 2/30
See application file for complete search history.

(56) References Cited

U.S. PATENT DOCUMENTS

| | | | |
|---|---|---|---|
| 2004/0197646 A1* | 10/2004 | Hatta | H01M 2/021 429/184 |
| 2007/0141366 A1* | 6/2007 | Rivett | B32B 27/32 428/457 |
| 2008/0206636 A1* | 8/2008 | Sanada | H01M 2/00 429/185 |
| 2010/0173190 A1 | 7/2010 | Tsuchiya | |
| 2010/0216016 A1* | 8/2010 | Seino | H01M 2/021 429/185 |
| 2011/0045337 A1 | 2/2011 | Lee et al. | |
| 2011/0287308 A1 | 11/2011 | Kim et al. | |
| 2012/0189908 A1* | 7/2012 | Tsutsumi | H01G 9/016 429/179 |

* cited by examiner

HIGHLY HEAT-RESISTANT FILM FOR ELECTRODE TERMINALS

TECHNICAL FIELD

The present invention relates to a highly heat-resistant film for electrode terminals, a method for producing the heat-resistant film, and an electrode terminal structure including the heat-resistant film. More specifically, the present invention relates to a highly heat-resistant film for electrode terminals that simultaneously meets requirements in terms of thermal adhesiveness and high temperature dimensional stability, which are contradictory to each other in conventional films for electrode terminals of secondary batteries, and has enhanced electrolyte resistance to improve the durability of a secondary battery, a method for producing the heat-resistant film, and an electrode terminal structure including the heat-resistant film.

BACKGROUND ART

With the recent rapid advances in the development of portable/wireless electronic devices, there has been an increasing demand for secondary batteries with high energy density for the purpose of reducing the size and weight of the electronic products.

In response to this demand, lithium ion secondary batteries have been widely used in personal wireless electronic devices, including mobile phones, personal computers, camcorders, portable CD players and personal digital assistants (PDAs), due to their high energy density, high operating voltage, and excellent storage and life characteristics.

Such a lithium ion secondary battery uses a liquid electrolyte composed of $LiPF_6$ and an organic solvent. An aluminum can is used as a packaging material to prevent the liquid electrolyte from leaking from the lithium ion secondary battery and to avoid the danger of explosion of the lithium ion secondary battery associated with the use of the liquid electrolyte.

As a result, an increase in the weight and volume of the lithium ion secondary battery is inevitable. There also still exists a danger of leakage of the liquid electrolyte and explosion.

To overcome such disadvantages, lithium polymer secondary batteries are currently being developed. In a lithium polymer secondary battery, a gel type polymer electrolyte is used or a liquid electrolyte is impregnated into a separator to reduce the danger of leakage of the electrolyte solution. A pouch is employed as an external case to reduce the danger of explosion while enabling weight reduction and slimness.

As widely known in the art, such a pouch structure includes an aluminum laminate pouch as an external packaging material connected to electrode terminals made of metals (for example, Al for cathode and Ni or Cu for anode). The innermost layer of the aluminum laminate pouch is a cast polypropylene (CPP) film produced by polymerization of propylene obtained from naphtha or natural gas cracking.

Before thermal adhesion of the cast film to the metallic electrode terminals, a polar modified polypropylene resin, which is produced by modifying a cast polypropylene resin with a compound having a polar group, is coated on the electrode terminals. The modified polypropylene film is inserted into the aluminum (Al) pouch and is thermally bonded to the electrode terminals made of metals (for example, Al for cathode and Ni or Cu for anode). The modified polypropylene film is also thermally bonded to the cast polypropylene film constituting the innermost layer of the aluminum pouch to seal the battery. This sealing separates the inside of the battery from the outside so that the electrolyte solution can be prevented from leakage. When the thermal bonding is performed, the modified polypropylene resin is melted. Thereafter, the modified polypropylene resin is solidified and shrinks. Portions of the modified polypropylene film laminated in contact with the cast polypropylene film at the lateral sides of the electrode terminals also shrink. This shrinkage leads to unsatisfactory sealing of the battery, failing to prevent leakage of the electrolyte solution.

In other words, a conventional bilayer film structure includes a heat-resistant polypropylene layer in contact with a pouch and a polypropylene layer in contact with the metal terminals. If the heat-resistant polypropylene layer is not crosslinked, sufficient thermal stability of the film structure is not expected. On the contrary, in the case where the heat-resistant polypropylene layer is crosslinked, it is necessary to form an additional polypropylene layer on the crosslinked film. That is, two or more unnecessary processes are further required, entailing high processing cost.

Further, an essential problem of the crosslinked film is relatively poor adhesion to the surface of the pouch upon thermal pressing compared to the uncrosslinked film.

A conventional trilayer film structure includes a polypropylene layer in contact with the pouch, a polypropylene layer in contact with the metal terminals, and a PEN or PET layer as an intermediate layer interposed between the two polypropylene layers. That is, the PP films are formed on both surfaces of the heat-resistant polyester film as an interlayer. The PP films exhibit improved thermal adhesion to the pouch and the metal terminals, but the intermediate polyester film or an adhesive component used for attachment of the layers is susceptible to an electrolyte, causing a serious problem of interlayer peeling.

DISCLOSURE

Technical Problem

It is a first object of the present invention to provide a highly heat-resistant film for electrode terminals that simultaneously meets requirements in terms of thermal adhesiveness and high temperature dimensional stability, which are contradictory to each other in conventional films for electrode terminals of secondary batteries, and has enhanced electrolyte resistance to improve the durability of a secondary battery.

It is a second object of the present invention to provide a method for producing a highly heat-resistant film for electrode terminals that simultaneously meets requirements in terms of thermal adhesiveness and high temperature dimensional stability, which are contradictory to each other in conventional films for electrode terminals of secondary batteries, and has enhanced electrolyte resistance to improve the durability of a secondary battery.

It is a third object of the present invention to provide an electrode terminal structure including a highly heat-resistant film for electrode terminals that simultaneously meets requirements in terms of thermal adhesiveness and high temperature dimensional stability, which are contradictory to each other in conventional films for electrode terminals of secondary batteries, and has enhanced electrolyte resistance to improve the durability of a secondary battery.

Technical Solution

In order to accomplish the first object of the present invention, there is provided a highly heat-resistant film for electrode terminals, including a polymer layer as a central substrate to be sealably interposed between a pouch and electrode terminals wherein the polymer layer is formed of at least one polymer selected from the group consisting of an ethylene-norbornene copolymer, polymethylpentene, polyalkylene terephthalate, and polyphenylene sulfide resin.

In an embodiment, the polymer layer may be formed of a mixture of at least one polymer selected from the group consisting of an ethylene-norbornene copolymer, polymethylpentene, polyalkylene terephthalate and polyphenylene sulfide with a polypropylene resin in a weight ratio of 1:9 to 5:5.

In a further embodiment, the ethylene-norbornene copolymer may be represented by Formula 1:

(1)

wherein x and y are integers of 1 or more.

In another embodiment of the present invention, y in Formula 1 may correspond to an amount of 60 to 80 parts by weight, based on 100 parts by weight of the ethylene-norbornene copolymer.

In another embodiment of the present invention, the polymethylpentene may be a linear isotactic polyolefin having 4-methyl-1-pentene as a basic skeleton structure, represented by Formula 2:

(2)

wherein n is an integer of 1 or more.

In another embodiment of the present invention, the polymethylpentene may have a melt flow rate of 5 to 50.

In another embodiment of the present invention, the polyalkylene terephthalate may be represented by Formula 3:

(3)

wherein n is an integer of 10,000 or more and m is an integer of 2 or more.

In another embodiment of the present invention, the polyphenylene sulfide may be represented by Formula 4:

(4)

wherein n is an integer of 1 or more.

In another embodiment of the present invention, the heat-resistant film may further include at least one functional composite layer on and/or under the polymer layer to be interposed between the pouch and the electrode terminals wherein the functional composite layer is formed of a modified polyolefin resin, a cast propylene resin, an ethylene-propylene copolymer, an ethylene-propylene isotactic block copolymer or an ethylene-propylene syndiotactic block copolymer.

In another embodiment of the present invention, the heat-resistant film may further include an additional layer between the polymer layer and the functional composite layer wherein the additional layer is formed of a modified polyolefin resin, a cast propylene resin, an ethylene-propylene copolymer, an ethylene-propylene isotactic block copolymer or an ethylene-propylene syndiotactic block copolymer.

In another embodiment of the present invention, the heat-resistant film may further include an additional layer between the polymer layer and the functional composite layer wherein the additional layer is formed of a mixture of at least one polymer selected from the group consisting of an ethylene-norbornene copolymer, polymethylpentene, polyalkylene terephthalate and polyphenylene sulfide with a polypropylene resin in a weight ratio of 1:9 to 5:5.

In another embodiment of the present invention, the modified polyolefin resin may be selected from the group consisting of: copolymers of ethylene or propylene and monomers having polar groups, such as ethylene/acrylic acid copolymers, ethylene/methacrylic acid copolymers, ethylene/ethyl acrylate copolymers, ethylene/butyl acrylate copolymers, ethylene/vinyl acetate copolymers, ethylene/itaconic acid copolymers, ethylene/monomethyl maleate copolymers, ethylene/maleic acid copolymers, ethylene/acrylic acid/methyl methacrylate copolymers, ethylene/methacrylic acid/ethyl acrylate copolymers, ethylene/monomethyl maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/trifluorochloride ethylene/methacrylic acid copolymers, ethylene/sodium methacrylate copolymers, ethylene/zinc acrylate copolymers, ethylene/sodium styrene sulfonate copolymers, styrene/ethylene/propylene copolymers, and propylene copolymers corresponding to these ethylene copolymers; maleic anhydride grafted polyethylene and polypropylene resins as substituted polyolefin resins, such as maleic anhydride grafted high-density polyethylene (m-HDPE), maleic anhydride grafted propylene (m-PP), and maleic anhydride grafted polyethylene/propylene copolymers (m-cpp); chlorinated polyethylene and polypropylene (CM); and chlorosulfonated polyethylene and polypropylene (CSM).

In order to accomplish the second object of the present invention, there is provided a method for producing a highly heat-resistant film for electrode terminals, the method including melting a material for a polymer layer, extruding the molten material to form a polymer layer, co-extruding a modified polyolefin resin, a cast propylene resin, an ethylene-propylene copolymer, an ethylene-propylene isotactic block copolymer or an ethylene-propylene syndiotactic block copolymer with the polymer layer to form at least one functional composite layer on and/or under the polymer layer, and casting the multilayer structure.

In an embodiment of the present invention, the method may further include forming an additional layer between the polymer layer and the functional composite layer wherein the additional layer is formed of a mixture of at least one polymer selected from the group consisting of an ethylene-norbornene copolymer, polymethylpentene, polyalkylene terephthalate and polyphenylene sulfide with a polypropylene resin in a weight ratio of 1:9 to 5:5.

According to the present invention, there is also provided a method for producing a highly heat-resistant film for electrode terminals, the method including melt-mixing materials for a polymer layer, extruding the molten mixture to form a polymer layer, co-extruding a modified polyolefin resin, a cast propylene resin, an ethylene-propylene copolymer, an ethylene-propylene isotactic block copolymer or an ethylene-propylene syndiotactic block copolymer with the polymer layer to form at least one functional composite layer on and/or under the polymer layer, and casting the multilayer structure.

In an embodiment of the present invention, the method may further include forming an additional layer between the polymer layer and the functional composite layer wherein the additional layer is formed of a mixture of at least one polymer selected from the group consisting of an ethylene-norbornene copolymer, polymethylpentene, polyalkylene terephthalate and polyphenylene sulfide with a polypropylene resin in a weight ratio of 1:9 to 5:5.

In order to accomplish the third object of the present invention, there is provided a highly heat-resistant electrode terminal structure including a highly heat-resistant film for electrode terminals produced by one of the methods wherein the heat-resistant film is interposed and thermally pressed between a pouch and electrode terminals.

In an embodiment of the present invention, a variation in the area of the heat-resistant film after thermal pressing may be from 0.1 to 10%.

In a further embodiment of the present invention, the heat-resistant film may have an adhesive strength after thermal pressing of 2 N/mm or more.

Advantageous Effects

In the highly heat-resistant film for electrode terminals, the method for producing the heat-resistant film and the electrode terminal structure including the heat-resistant film according to the present invention, thermal adhesiveness and high temperature dimensional stability, which are contradictory to each other in conventional films for electrode terminals of secondary batteries, are ensured simultaneously. In addition, electrolyte resistance is enhanced to improve the durability of a secondary battery.

MODE FOR INVENTION

A highly heat-resistant film for electrode terminals, a method for producing the heat-resistant film, and an electrode terminal structure including the heat-resistant film according to embodiments of the present invention will now be described in detail with reference to the accompanying drawings. As the present invention allows for various changes and numerous embodiments, particular embodiments will be illustrated in the drawings and described in detail in the description. However, this is not intended to limit the present invention to particular modes of practice, and it is to be appreciated that all changes, equivalents, and substitutes that do not depart from the spirit and technical scope of the present invention are encompassed in the present invention. In the description of the drawings, like reference numerals are used to identify similar elements. Repeated elements in the drawings may be denoted by the same or different reference numerals for convenience of understanding and for ease of explanation and they will be considered as having unity within the technical ideas of the present invention. In the drawings, the dimensions of layers and regions may be exaggerated for clarity of illustration.

The present invention provides a highly heat-resistant film for electrode terminals. The heat-resistant film of the present invention includes a polymer layer as a central substrate to be sealably interposed between a pouch and electrode terminals wherein the polymer layer is formed of at least one polymer selected from the group consisting of an ethylene-norbornene copolymer, polymethylpentene, polyalkylene terephthalate and polyphenylene sulfide, or a mixture of at least one polymer selected from the group consisting of an ethylene-norbornene copolymer, polymethylpentene, polyalkylene terephthalate, and polyphenylene sulfide with a polypropylene resin in a weight ratio of 1:9 to 5:5.

The pouch and the electrode terminals may be made of metallic materials. Typically, the pouch may be made of aluminum, and the electrode terminals may include a cathode made of aluminum and an anode made of nickel or copper.

The polymer layer as a central substrate is interposed between the pouch and the electrode terminals to close spaces defined between the inner surface of the pouch and the electrode terminals. The polymer layer may be formed of at least one polymer selected from the group consisting of an ethylene-norbornene copolymer, polymethylpentene, polyalkylene terephthalate, and polyphenylene sulfide.

Alternatively, the polymer layer may be formed of a mixture of at least one polymer selected from the group consisting of an ethylene-norbornene copolymer, polymethylpentene, polyalkylene terephthalate, and polyphenylene sulfide with a polypropylene resin in a weight ratio of 1:9 to 5:5. If the proportion of the polymer is less than the lower limit (i.e. 1:9), poor high temperature dimensional stability may be caused upon thermal pressing. Meanwhile, if the proportion of the polymer exceeds the upper limit (i.e. 5:5), the adhesion of the polymer layer to a functional composite layer or an additional layer to be formed in subsequent steps may be greatly reduced, causing a problem of interlayer peeling during production processing or use.

The ethylene-norbornene copolymer may be represented by Formula 1:

(1)

wherein x and y are integers of 1 or more.

y in Formula 1 may correspond to an amount of 60 to 80 parts by weight, based on 100 parts by weight of the ethylene-norbornene copolymer. If y in Formula 1 corresponds to an amount of less than 60 parts by weight, poor heat resistance may be caused. Meanwhile, if y in Formula 1 corresponds to an amount exceeding 80 parts by weight, mixing uniformity with the polypropylene resin may be deteriorated, which negatively affects the adhesion at the interface with another layer to be laminated.

The expression "y corresponds to an amount of 60 to 80 parts by weight" can be interpreted to mean that the repeating unites denoted by x and y are present in amounts of 20 to 40 parts by weight and 60 to 80 parts by weight, respectively, based on 100 parts by weight of the ethylene-norbornene copolymer, in amounts of 20 to 40% by weight and 60 to 80% by weight, respectively, or in a weight ratio of 2:8 to 4:6.

The polymethylpentene may be a linear isotactic polyolefin having 4-methyl-1-pentene as a basic skeleton structure, represented by Formula 2:

(2)

wherein n is an integer of 1 or more.

The polymethylpentene may have a melt flow rate (MFR) of 5 to 50 at 260° C. and 5 kg. If the melt flow rate is lower than 5, film formation may be difficult or mixing uniformity with the polypropylene resin may be deteriorated. Meanwhile, if the melt flow rate exceeds 50, film quality may be poor and heat resistance may be deteriorated.

The polyalkylene terephthalate may be represented by Formula 3:

(3)

wherein n is an integer of 10,000 or more and m is an integer of 2 or more.

If m in Formula 3 is less than 2, poor resistance to an electrolyte of a secondary battery may be caused.

The polyphenylene sulfide may be represented by Formula 4:

(4)

wherein n is an integer of 1 or more.

The heat-resistant film of the present invention may further include at least one functional composite layer on and/or under the polymer layer to ensure sufficient adhesion to the pouch and the electrode terminals or hermetic sealing between the pouch and the electrode terminals. The functional composite layer may be formed of a modified polyolefin resin, a cast propylene resin, an ethylene-propylene copolymer, an ethylene-propylene isotactic block copolymer or an ethylene-propylene syndiotactic block copolymer. The formation of the functional composite layer may be realized by lamination or coating.

Figure 1:
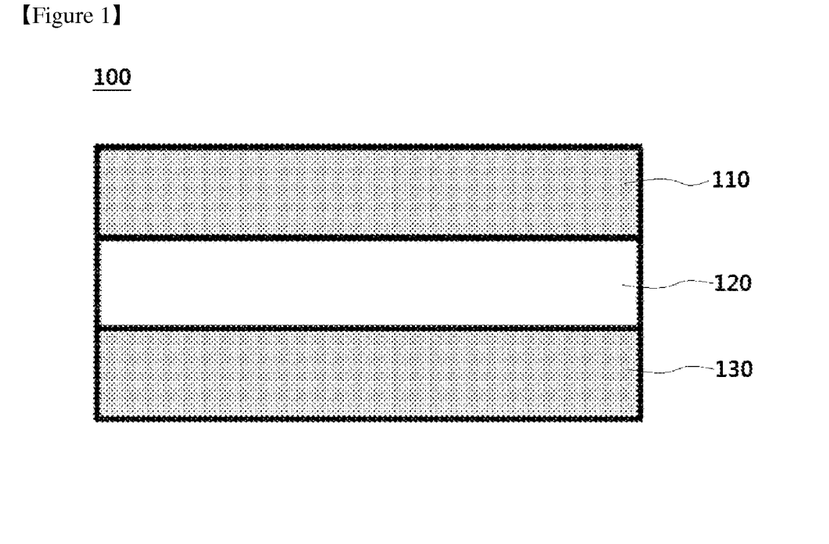
FIG. 1 is a cross-sectional view illustrating a portion of a highly heat-resistant film for electrode terminals according to the present invention, which includes a central substrate and functional composite layers.

An exemplary structure of the heat-resistant film is illustrated in FIG. 1. Referring to FIG. 1, the heat-resistant film 100 includes a central substrate 120, and functional composite layers 110 and 130 formed on and under the central substrate 120, respectively.

The modified polyolefin resin may be selected from the group consisting of: copolymers of ethylene or propylene and monomers having polar groups, such as ethylene/acrylic acid copolymers, ethylene/methacrylic acid copolymers, ethylene/ethyl acrylate copolymers, ethylene/butyl acrylate copolymers, ethylene/vinyl acetate copolymers, ethylene/itaconic acid copolymers, ethylene/monomethyl maleate copolymers, ethylene/maleic acid copolymers, ethylene/acrylic acid/methyl methacrylate copolymers, ethylene/methacrylic acid/ethyl acrylate copolymers, ethylene/monomethyl maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/trifluorochloride ethylene/methacrylic acid copolymers, ethylene/sodium methacrylate copolymers, ethylene/zinc acrylate copolymers, ethylene/sodium styrene sulfonate copolymers, styrene/ethylene/propylene copolymers, propylene/acrylic acid copolymers, propylene/methacrylic acid copolymers, propylene/ethyl acrylate copolymers, propylene/butyl acrylate copolymers, propylene/vinyl acetate copolymers, propylene/itaconic acid copolymers, propylene/monomethyl maleate copolymers, propylene/maleic acid copolymers, propylene/acrylic acid/methyl methacrylate copolymers, propylene/methacrylic acid/ethyl acrylate copolymers, propylene/monomethyl maleate/ethyl acrylate copolymers, propylene/methacrylic acid/vinyl acetate copolymers, propylene/acrylic acid/vinyl alcohol copolymers, propylene/propylene/acrylic acid copolymers, propylene/styrene/acrylic acid copolymers, propylene/methacrylic acid/acrylonitrile copolymers, propylene/fumaric acid/vinyl methyl ether copolymers, propylene/vinyl chloride/acrylic acid copolymers, propylene/vinylidene chloride/acrylic acid copolymers, propylene/trifluorochloride ethylene/methacrylic acid copolymers, propylene/sodium methacrylate copolymers, propylene/zinc acrylate copolymers, propylene/sodium styrene sulfonate copolymers, and styrene/propylene/propylene copolymers; maleic anhydride grafted polyethylene and polypropylene resins as substituted polyolefin resins, such as maleic anhydride grafted high-density polyethylene (m-HDPE), maleic anhydride grafted propylene (m-PP), and maleic anhydride grafted polyethylene/propylene copolymers (m-cpp); chlorinated polyethylene and polypropylene (CM); and chlorosulfonated polyethylene and polypropylene (CSM).

The term "functional" in the definition of the functional composite layer is intended to mean that the functional composite layer is attached to the pouch and/or the metal terminals by thermal pressing to ensure thermal adhesiveness and high temperature dimensional stability while possessing electrolyte resistance required for practical use. The term "composite layer" in the definition of the functional composite layer means that the heat-resistant film of the present invention has a multilayer structure, such as a bilayer, trilayer, tetralayer or pentalayer structure. When the composite layer is laminated only on the polymer layer, the heat-resistant film has a bilayer structure. Alternatively, two composite layers may be laminated on and under the polymer layer. In this case, the heat-resistant film has a trilayer structure.

The heat-resistant film of the present invention may further include an additional layer formed of a modified polyolefin resin, a cast propylene resin, an ethylene-propylene copolymer, an ethylene-propylene isotactic block copolymer or an ethylene-propylene syndiotactic block copolymer between the pouch and the functional composite layer. In this case, the heat-resistant film may have a trilayer, tetralayer or pentalayer structure.

The additional layer may be formed of a mixture of at least one polymer selected from the group consisting of an ethylene-norbornene copolymer, polymethylpentene, polyalkylene terephthalate and polyphenylene sulfide with a polypropylene resin in a weight ratio of 1:9 to 5:5.

Figure 2:
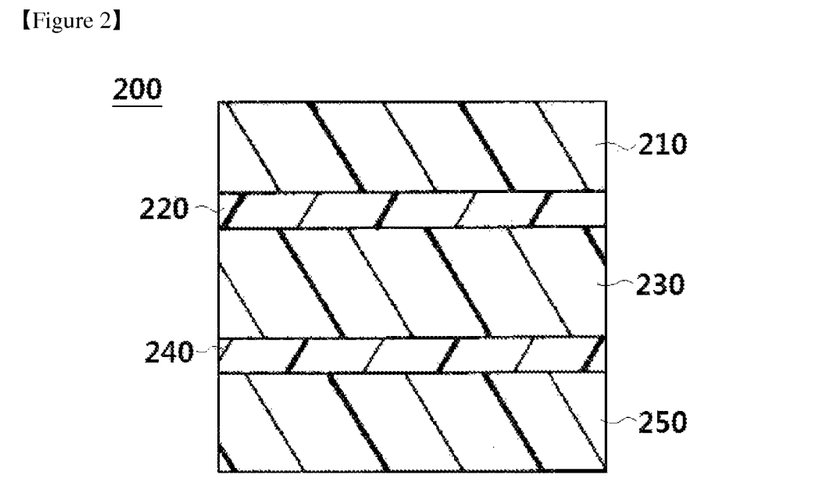
FIG. 2 is a cross-sectional view illustrating a portion of a highly heat-resistant film for electrode terminals according to the present invention, which includes a central substrate, functional composite layers and additional layers.

An exemplary pentalayer structure of the heat-resistant film is illustrated in FIG. 2. Referring to FIG. 2, the heat-resistant film 200 includes a central substrate 230, additional layers 220 and 240 formed on and under the central substrate 230, respectively, and functional composite layers 210 and 250 as the uppermost and lowermost layers, respectively.

The highly heat-resistant film of the present invention, which includes the functional composite layer and the additional layer, is interposed and thermally pressed between the pouch and the electrode terminals. The thermal pressing may be performed in various manners according to the pressing conditions, such as pressure, time and temperature. It should be understood that the pressing conditions can be controlled depending on the constituent components of the layers.

When comparing the trilayer and pentalayer structures of the highly heat-resistant film, the trilayer structure may be advantageous in terms of stability than the pentalayer structure. However, the pentalayer structure may be more effective when the constituent materials of the layers have low adhesive strength, for example, polypropylene and polybutylene terephthalate are used. That is, it can be understood that there is a trade-off between the benefit of good adhesion between the layers and the drawback of poor dimensional stability of the multilayer structure.

The present invention also provides a method for producing the highly heat-resistant film. The method of the present invention includes melting the material for the polymer layer, co-extruding the molten material, and casting the extrudate. The method of the present invention may further include forming at least one functional composite layer on and/or under the polymer layer before casting. The functional composite layer may be formed of a modified polyolefin resin, a cast polypropylene resin, an ethylene-propylene copolymer, an ethylene-propylene isotactic block copolymer or an ethylene-propylene syndiotactic block copolymer. The method of the present invention may further include forming an additional layer between the polymer layer and the functional composite layer. The additional layer may be formed of a modified polyolefin resin, a cast polypropylene resin, an ethylene-propylene copolymer, an ethylene-propylene isotactic block copolymer or an ethylene-propylene syndiotactic block copolymer. Alternatively, the additional layer may be formed of a mixture of at least one polymer selected from the group consisting of an ethylene-norbornene copolymer, polymethylpentene, polyalkylene terephthalate and polyphenylene sulfide with a polypropylene resin in a weight ratio of 1:9 to 5:5.

A variation in the area of the highly heat-resistant film after thermal pressing may be from 0.1 to 10%. The area variation is expressed as a percentage of the area of the heat-resistant film after thermal pressing with respect to the area of the heat-resistant film before thermal pressing. If the area variation is less than 0.1%, very good dimensional stability is obtained but sufficient adhesive strength is not ensured due to too low pressing pressure and temperature. Meanwhile, if the area variation exceeds 10%, curling may occur in the terminals and the film protruding outwardly from the pouch sealed after thermal pressing. In this case, the modified film attached to the conductors of the terminals may adversely affect the insulation between the pouch and the terminals.

The highly heat-resistant film may have an adhesive strength after thermal pressing of 2 N/mm or more. If the adhesive strength is less than 2 N/mm, the heat-resistant film cannot withstand stress caused by repeated shrinkage and expansion during charging/discharging of a secondary battery, resulting in leakage of an electrolyte solution.

The upper limit of the adhesive strength is not particularly limited and may be, for example, 20 N/mm. The reason for this limitation is that the adhesive strength of the heat-resistant film can sufficiently compensate for deterioration of the durability of a secondary battery resulting from a reduction in adhesive strength at other sites of the pouch.

Preferred embodiments of the invention will be explained with reference to the following examples, but the invention is not limited to these particular embodiments. It will be apparent to those skilled in the art that various modifications and variations are possible, without departing from the spirit and scope of the invention. All such modifications, variations and equivalents thereof should be construed as falling within the scope of the invention.

Preparative Examples 1-8: Preparation of Polymer Layer Compounds

As shown in Table 1, the components were melt-mixed in 100 liter kneaders at 250° C. for 40 min to prepare polymer layer compounds.

TABLE 1

| Component | Prep. Ex. 1 | Prep Ex. 2 | Prep. Ex. 3 | Prep. Ex. 4 | Prep. Ex. 5 | Prep. Ex. 6 | Prep. Ex. 7 | Prep. Ex. 8 |
|---|---|---|---|---|---|---|---|---|
| Ethylene-norbornene copolymer[1] | 20 | 35 | 45 | | | | | |
| Polymethyl-pentene[2] | | | | 20 | 40 | | | |
| Polyalkylene terephthalate[3] | | | | | | 20 | | 50 |
| Polyphenyl-ene sulfide[4] | | | | | | | 20 | |
| Polypro-pylene[5] | 80 | 65 | 55 | 80 | 60 | 80 | 80 | 50 |

Preparative Examples 9-12: Preparation of Polymer Layer Compounds

As shown in Table 2, the components were melt-mixed in 100 liter kneaders at 250° C. for 40 min to prepare polymer layer compounds.

TABLE 2

| Component | Prep. Ex. 9 | Prep. Ex. 10 | Prep. Ex. 11 | Prep. Ex. 12 | Remarks |
|---|---|---|---|---|---|
| Ethylene-norbornene copolymer[1] | 100 | | | | Polypropylene[5] 0 |
| Polymethylpentene[2] | | 100 | | | Polypropylene[5] 0 |
| Polyalkylene terephthalate[3] | | | 100 | | Polypropylene[5] 0 |
| Polyphenylene sulfide[4] | | | | 100 | Polypropylene[5] 0 |

The numbers in Tables 1 and 2 indicate relative weight ratios of the components,
Ethylene-norbornene copolymer[1]: Weight ratio x:y = 2:8, glass transition temperature = 138° C., melt flow rate = 14 g/10 min (260° C./2.16 kg),
Polymethylpentene[2]: Melt flow rate = 6 g/10 min (260° C. and 5 kg), melting point = 233° C.,
Polyalkylene terephthalate[3]: Polybutylene terephthalate, specific gravity = 1.31 g/cc, melting point = 225° C., melt flow rate = 15 g/10 min (250° C./2.16 kg),
Polyphenylene sulfide[4]: Number average molecular weight = 25,000,
Polypropylene[5]: Cast polypropylene, melt flow rate = 8.0 g/10 min at 230° C. under ASTM D-1238 test conditions, density = 0.9 g/cm³, heat deflection temperature = 115° C. (4.6 kg/cm²).

Examples 1-7: Production of Highly Heat-Resistant Films for Electrode Terminals

Each of the polymer layer compounds prepared in Preparative Examples 1-7 was extruded in casting rolls and a co-extruder to form a central substrate film. A dry blend of cast polypropylene masterbatches containing 1 wt % of carbon black as a black pigment was added to the upper surface (to be in contact with a pouch) of the central substrate film, and a maleic anhydride grafted polypropylene/ethylene copolymer resin as adhesive modified polypropylene was added to the lower surface (to be in contact with metal conductors) of the central substrate film. The dry blend and the copolymer resin were co-extruded with the central substrate film to form a trilayer structure. The trilayer structure was passed through a T-die and cast in the casting rolls to produce a highly heat-resistant film for electrode terminals with an average thickness of 120 μm.

Example 8: Production of Highly Heat-Resistant Film for Electrode Terminals

The polymer layer compound prepared in Preparative Example 8 was extruded in casting rolls and a co-extruder to form a central substrate film. A second modified polyolefin resin (Mitsubishi, Japan) having a melt flow rate of 3.5 g/10 min at 190° C. and 2.16 kgf, a melting point of 120° C. and good adhesion to polybutylene terephthalate was located on and under the central substrate film. In the same manner as in Examples 1-7, a dry blend of cast polypropylene masterbatches containing 1 wt % of carbon black as a black pigment was added to the uppermost side (to be in contact with a pouch), and a maleic anhydride grafted polypropylene/ethylene copolymer resin as adhesive modified polypropylene was added to the lowermost side (to be in contact with metal conductors). The modified polyolefin resin, the dry blend and the copolymer resin were co-extruded with the central substrate film to form a pentalayer structure. The pentalayer structure was passed through a T-die and cast in the casting rolls to produce a highly heat-resistant film for electrode terminals with an average thickness of 120 μm.

Examples 9-12: Production of Highly Heat-Resistant Films for Electrode Terminals Each of the polymer layer compounds prepared in Preparative Examples 9-12 was extruded in casting rolls and a co-extruder to form a central substrate film. The compounds of Preparative Example 3, 5, 6 and 7 were arranged on and under the central substrate film. A dry blend of cast polypropylene masterbatches containing 1 wt % of carbon black as a black pigment was added to the uppermost side (to be in contact with a pouch), and a maleic anhydride grafted polypropylene/ethylene copolymer resin as adhesive modified polypropylene was added to the lowermost side (to be in contact with metal conductors) to form a pentalayer structure. The pentalayer structure was passed through a T-die and cast in the casting rolls to produce a highly heat-resistant film for electrode terminals with an average thickness of 120 μm.

Comparative Example 1

A dry blend of polypropylene masterbatches containing a dye was located in an upper position (to be in contact with a pouch) and adhesive modified polypropylene was located in a lower position (to be in contact with conductors). The dry blend and the modified polypropylene were co-extruded to form a bilayer structure. The bilayer structure was passed through a T-die and cast in casting rolls to produce a bilayer film for electrode terminals with an average thickness of 120 µm.

Comparative Example 2

A dry blend of polypropylene masterbatches containing a dye was added to the upper side (to be in contact with a pouch) of a PET resin as a central substrate, and adhesive modified polypropylene was added to the lower side (to be in contact with conductors) of the central substrate. The dry blend, the PET resin and the modified polypropylene were co-extruded to form a trilayer structure. The trilayer structure was passed through a T-die and cast in casting rolls to produce a trilayer film for electrode terminals with an average thickness of 120 nm.

Test Example 1: Evaluation of Adhesive Strength

An aluminum conductor having a width of 8 mm and a thickness of 100 µm was subjected to degreasing and surface treatment. Each of the heat-resistant films produced in Comparative Examples 1-2 and Examples 1-12 was cut to a size of 7.5 mm (w)×10 mm (l). The film pieces were thermally adhered to the upper and lower surfaces of the metal conductor at 180° C. and 70 bar for 8 sec to produce a specimen. The adhesive strengths at the interfaces between the conductor and the film pieces were measured at a cross head speed of 20 m/min using a 180° peel tester. An aluminum (Al) pouch film for a battery (manufactured by DNP, Japan) was thermally adhered to the film pieces of the specimen at 200° C. and 70 bar for 15 sec. Thereafter, the adhesive strengths at the interfaces between the pouch film and the film pieces were measured at a cross head speed of 20 m/min using a 180° peel tester. The results are shown in Tables 3 and 4.

TABLE 3

| Adhesive strength | Comp. Ex. 1 | Comp. Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Pouch (N/mm) | >7.0 | <0.8 | >7.0 | >7.0 | >7.0 | >7.0 | >7.0 | >7.0 | >7.0 | >7.0 |
| Metal conductor (N/mm) | >3.0 | <0.8 | >3.0 | >3.0 | >3.0 | >3.0 | >3.0 | >3.0 | >3.0 | >3.0 |
| Remarks | — | Interlayer peeling in the film pieces | — | — | — | — | — | — | — | — |

TABLE 4

| Adhesive strength | Ex. 9 | Ex. 10 | Ex. 11 | Ex. 12 |
|---|---|---|---|---|
| Pouch (N/mm) | >7.0 | >7.0 | >7.0 | >7.0 |
| Metal conductor (N/mm) | >3.0 | >3.0 | >3.0 | >3.0 |
| Remarks | — | — | — | — |

Test Example 2: Evaluation of High Temperature Dimensional Stability

As in Test Example 1, each of the heat-resistant films produced in Comparative Examples 1-2 and Examples 1-12 was cut to a size of 7.5 mm (w)×10 mm (l) and thermally adhered to the upper and lower surfaces of a metal conductor to produce a specimen. The area and thickness of the film pieces were measured. A pouch film was thermally adhered to the surfaces of the specimen at 200° C. and 70 bar for 15 sec. Thereafter, the pouch film was peeled from the specimen. The area and thickness of the film pieces where thermal deformation occurred were measured. A variation (%) in the area and thickness of the film pieces after thermal adhesion was calculated. The results are shown in Tables 5 and 6.

TABLE 5

| | Comp. Ex. 1 | Comp. Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Area variation (%) | >20 | — | <8 | <5 | 4 | <9 | <6 | <9 | <5 | <5 |
| Remarks | | Interlayer peeling in the film pieces | | | | | | | | |

TABLE 6

|  | Ex. 9 | Ex. 10 | Ex. 11 | Ex. 12 |
|---|---|---|---|---|
| Area variation (%) | <3 | <3 | <2 | <2 |
| Remarks |  |  |  |  |

Test Example 3: Evaluation of Electrolyte Resistance

An aluminum conductor having a width of 6 mm and a thickness of 100 μm was subjected to degreasing and surface treatment. Each of the films produced in Comparative Examples 1-2 and Examples 1-12 was cut to a size of 7.5 mm (w)×10 mm (1). The film pieces were thermally adhered to the upper and lower surfaces of the metal conductor at 180° C. and 70 bar for 8 sec to produce a specimen. The specimen was impregnated with a standard electrolyte containing 1 mole of $LiPF_6$ in EC/DEC (1/1) and allowed to stand in a chamber at 85° C. The specimen impregnated with the electrolyte was washed and dried. An observation was made as to whether or not a red penetrant penetrated into the specimen. The results are shown in Tables 7 and 8.

TABLE 7

|  | Comp. Ex. 1 | Comp. Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Whether or not penetration occurred | N | Y | N | N | N | N | N | N | N | N |
| Remarks | — | Penetrated between the film layers | — | — | — | — | — | — | — | — |

TABLE 8

|  | Ex. 9 | Ex. 10 | Ex. 11 | Ex. 12 |
|---|---|---|---|---|
| Whether or not penetration occurred | N | N | N | N |
| Remarks | — | — | — | — |

As can be seen from the results in Tables 3-8, the inventive films had much better high adhesiveness and high temperature dimensional stability than the comparative films. In addition, the inventive films showed better electrolyte resistance under accelerated test conditions, demonstrating their better durability.

EXPLANATION OF ELEMENTS OF THE DRAWINGS

100, 200 Highly heat-resistant films for electrode terminals,
110, 130, 210, 250 Functional composite layers,
120, 230 Central substrates,
220, 240 Additional layers

The invention claimed is:

1. A highly heat-resistant multi-layered film to be sealably interposed between a pouch and electrode terminals in a secondary battery, comprising:
   a central substrate consisting of a polymer layer that is a mixture of (a) at least one polymer selected from the group consisting of an ethylene-norbornene copolymer and a polymethylpentene and (b) a polypropylene resin; and
   at least one functional composite layer provided on the central substrate and comprised of a modified polyolefin resin, a cast propylene resin, an ethylene-propylene copolymer, an ethylene-propylene isotactic block copolymer or an ethylene-propylene syndiotactic block copolymer,
   wherein the at least one functional composite layer is attached to at least one of said pouch and said electrode terminals by thermal pressing to simultaneously ensure thermal adhesiveness and high temperature dimensional stability.

2. The highly heat-resistant film according to claim 1, wherein the mixture that forms the polymer layer has a weight ratio of the at least one polymer to the polypropylene resin that ranges from 1:9 to 5:5.

3. The highly heat-resistant film according to claim 1, wherein the at least one polymer includes an ethylene-norbornene copolymer which is represented by Formula 1 as follows:

(1)

wherein x and y are integers of 1 or more.

4. The highly heat-resistant film according to claim 3, wherein y in Formula 1 corresponds to an amount of 60 to 80 parts by weight, based on 100 parts by weight of the ethylene-norbornene copolymer.

5. The highly heat-resistant film according to claim 1, wherein the at least one polymer includes a polymethylpentene which is a linear isotactic polyolefin having 4-methyl-1-pentene as a basic skeleton structure, represented by Formula 2 as follows:

(2)

wherein n is an integer of 1 or more.

6. The highly heat-resistant film according to claim 5, wherein the polymethylpentene has a melt flow rate of 5 to 50.

7. The highly heat-resistant film according to claim 1, further comprising at least one additional layer provided between the polymer layer and the at least one functional composite layer and comprised of a modified polyolefin resin, a cast propylene resin, an ethylene-propylene copolymer, an ethylene-propylene isotactic block copolymer or an ethylene-propylene syndiotactic block copolymer.

8. The highly heat-resistant film according to claim 1, further comprising at least one additional layer provided between the polymer layer and the at least one functional composite layer and comprised of a mixture of (a) at least one polymer selected from the group consisting of an ethylene-norbornene copolymer, polymethylpentene, and polyphenylene sulfide and (b) a polypropylene resin in a weight ratio of 1:9 to 5:5.

9. The highly heat-resistant film according to claim 7, wherein the at least one functional composite layer comprises a modified polyolefin resin and is selected from the group consisting of:
(a) copolymers of ethylene or propylene and monomers having polar groups, comprising:
ethylene/acrylic acid copolymers, ethylene/methacrylic acid copolymers, ethylene/ethyl acrylate copolymers, ethylene/butyl acrylate copolymers, ethylene/vinyl acetate copolymers, ethylene/itaconic acid copolymers, ethylene/monomethyl maleate copolymers, ethylene/maleic acid copolymers, ethylene/acrylic acid/methyl methacrylate copolymers, ethylene/methacrylic acid/ethyl acrylate copolymers, ethylene/monomethyl maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/trifluorochloride ethylene/methacrylic acid copolymers, ethylene/sodium methacrylate copolymers, ethylene/zinc acrylate copolymers, ethylene/sodium styrene sulfonate copolymers, styrene/ethylene/propylene copolymers, propylene/acrylic acid copolymers, propylene/methacrylic acid copolymers, propylene/ethyl acrylate copolymers, propylene/butyl acrylate copolymers, propylene/vinyl acetate copolymers, propylene/itaconic acid copolymers, propylene/monomethyl maleate copolymers, propylene/maleic acid copolymers, propylene/acrylic acid/methyl methacrylate copolymers, propylene/methacrylic acid/ethyl acrylate copolymers, propylene/monomethyl maleate/ethyl acrylate copolymers, propylene/methacrylic acid/vinyl acetate copolymers, propylene/acrylic acid/vinyl alcohol copolymers, propylene/propylene/acrylic acid copolymers, propylene/styrene/acrylic acid copolymers, propylene/methacrylic acid/acrylonitrile copolymers, propylene/fumaric acid/vinyl methyl ether copolymers, propylene/vinyl chloride/acrylic acid copolymers, propylene/vinylidene chloride/acrylic acid copolymers, propylene/trifluorochloride ethylene/methacrylic acid copolymers, propylene/sodium methacrylate copolymers, propylene/zinc acrylate copolymers, propylene/sodium styrene sulfonate copolymers, and styrene/propylene/propylene copolymers;
(b) maleic anhydride grafted polyethylene and polypropylene resins as substituted polyolefin resins, comprising:
maleic anhydride grafted high-density polyethylene (m-HDPE), maleic anhydride grafted propylene (m-PP), and maleic anhydride grafted polyethylene/propylene copolymers (m-cpp);
(c) chlorinated polyethylene and polypropylene (CM); and
(d) chlorosulfonated polyethylene and polypropylene (CSM).

10. In a secondary battery including a pouch and electrode terminals and a film to be sealably interposed between the pouch and the electrode terminals, the improvement comprising, as the film:
a highly heat-resistant multi-layered film comprised of:
a central substrate consisting of a polymer layer that is a mixture of (a) at least one polymer selected from the group consisting of an ethylene-norbornene copolymer and a polymethylpentene and (b) a polypropylene resin; and
at least one functional composite layer provided on the central substrate and being formed of a modified polyolefin resin, a cast propylene resin, an ethylene-propylene copolymer, an ethylene-propylene isotactic block copolymer or an ethylene-propylene syndiotactic block copolymer,
wherein the at least one functional composite layer is attached to at least one of said pouch and said electrode terminals by thermal pressing to ensure thermal adhesiveness and high temperature dimensional stability.

* * * * *